United States Patent [19]
Carter

[11] Patent Number: 6,026,229
[45] Date of Patent: *Feb. 15, 2000

[54] ANIMAL PROCESSING ASSAY SYSTEM

[76] Inventor: Franklin Carter, 3001 Rockborough Ct., Ft. Collins, Colo. 80525

[*] Notice: This patent is subject to a terminal disclaimer.

[21] Appl. No.: 09/018,508

[22] Filed: Feb. 3, 1998

Related U.S. Application Data

[63] Continuation-in-part of application No. 08/632,796, Apr. 17, 1996, Pat. No. 5,715,185.

[51] Int. Cl.[7] .................................................. G06F 17/00
[52] U.S. Cl. ...................... 395/500.27; 702/189; 426/644
[58] Field of Search .................... 395/500.27; 119/57.92, 119/174, 457; 348/141; 426/2, 92, 532, 644; 364/468.05; 424/78.31; 702/2, 81, 189

[56] References Cited

U.S. PATENT DOCUMENTS

| | | | |
|---|---|---|---|
| 3,785,345 | 1/1974 | Rhinehart et al. | 119/457 |
| 4,745,472 | 5/1988 | Hayes | 356/107 |
| 4,849,232 | 7/1989 | Baker et al. | 426/92 |
| 4,872,421 | 10/1989 | Laurent et al. | 119/174 |
| 5,091,195 | 2/1992 | Havens | 426/2 |
| 5,105,767 | 4/1992 | Gordon et al. | 119/57.92 |
| 5,247,460 | 9/1993 | LaBudde | 702/81 |
| 5,466,445 | 11/1995 | Hunter | 424/78.31 |
| 5,505,976 | 4/1996 | Bland et al. | 426/532 |
| 5,566,069 | 10/1996 | Clark, Jr. et al. | 702/2 |
| 5,715,185 | 2/1998 | Carter | 395/500.27 |

*Primary Examiner*—Kevin J. Teska
*Assistant Examiner*—Russell W. Frejd
*Attorney, Agent, or Firm*—Sheridan Ross P.C.

[57] ABSTRACT

A method and system for assaying changes to a procedure or practice in processing animals and animal by-products into saleable edible products is disclosed. In particular, the assay determines an impact of (a change in) an animal growing and processing related factor on an entire growing and processing system, wherein when the animal is a species of bird raised for its meat, the growing and processing system includes at least some the following components: a bird breeder farm, a bird hatchery, a bird growing facility, a bird meat processing plant, and a bird transportation capability. Such an analysis of the use of the factor provides for an assessment of the impact of the factor according to how it impacts a characteristic of saleable edible products output by the growing and processing system. More particularly, the assay determines a change in gross profits of the growing and processing system as a whole due to a change in the factor at one or more of the growing and processing system components. The present invention is particularly useful in assaying changes to chicken, turkey, duck, goose and quail growing and processing practices.

22 Claims, 26 Drawing Sheets

FIG. 3B

336 — FOR THE PRESENT BIRD POPULATION, DETERMINE STATISTICS RELATED TO THE WEIGHTS OF THE BIRDS, AS MEASURED AT THE PROCESSING PLANT 36, AS FOLLOWS:
- (A) AVG_WT ← DETERMINE THE AVERAGE WEIGHT OF A BIRD AT THE PROCESSING PLANT 36;
- (B) CARCASS_WT ← (AVG_WT) * (PCT_SALEABLE_MEAT) /100;
- (C) BREAST_WT ← (CARCASS_WT) * (PCT_BREAST_WT) /100;
- (D) PARTIAL_CARCASS_WT ← (CARCASS_WT) - (BREAST_WT).

340 — FOR THE PRESENT BIRD POPULATION, DETERMINE THE BIRD FEED COST STATISTICS AS FOLLOWS:
- (A) FEED_COST_PER_TON ← DETERMINE AVERAGE FEED COST PER TON;
- (B) FEED_COST_PER_LB ← FEED_COST_PER_TON / 2000;
- (C) FEED_CONVERSION ← DETERMINE THE AVERAGE NUMBER OF POUNDS OF BIRD FEED PROVIDED PER POUND OF BIRD PROCESSED; I.E., (TOTAL AMOUNT OF BIRD FEED FED) * [1/NBR_BIRDS_PROCESSED * AVG_WT)];
- (D) AMT_OF_FEED_PER_BIRD ← (AVG_WT) * (FEED_CONVERSION);
- (E) FEED_COST_PER_BIRD ← (AMT_OF_FEED_PER_BIRD) * (FEED_COST_PER_LB);
- (F) FEED_COST_PER_1000 ← (FEED_COST_PER_BIRD) * 1000.

344 — FOR THE PRESENT BIRD POPULATION, DETERMINE STATISTICS RELATED TO THE AVERAGE VALUE OF THE BIRDS AT THE PROCESSING PLANT 36 AS FOLLOWS:
- (A) PARTIAL_CARCASS_VALUE ← (PARTIAL_CARCASS_WT) * (PARTIAL_CARCASS_PRICE_PER_LB);
- (B) BREAST_VALUE ← (BREAST_WT) * (BREAST_PRICE_PER_LB);
- (C) BIRD_VALUE ← (PARTIAL_CARCASS_VALUE) + (BREAST_VALUE);
- (D) TOTAL_BIRD_VALUE ← (BIRD_VALUE) * [(NBR_BIRDS_PROCESSED) * NBR_CONDEMNED];
- (E) BIRD_VALUE_PER_1000 ← (TOTAL_BIRD_VALUE) * (1000) * [(1/NBR_BIRDS_PROCESSED)].

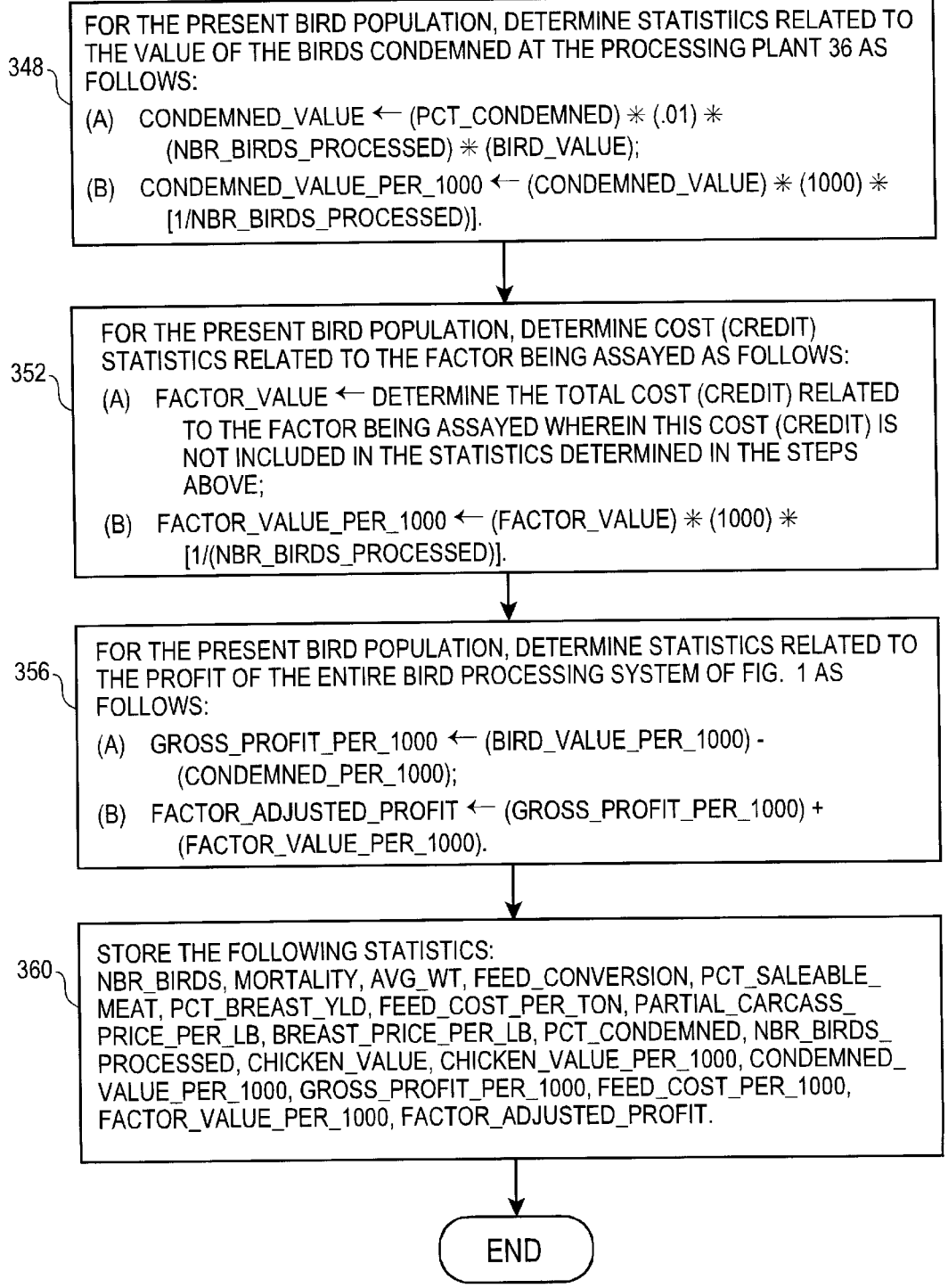

FIG. 5A

CHICKEN PROCESSING STATISTICS

| DESCRIPTION | POPULATION A | POPULATION B | IDENTIFIER NAMES |
|---|---|---|---|
| MORTALITY | 3.78% | 3.10% | MORTALITY |
| AVG. WEIGHT (LBS) | 5.02 | 5.13 | AVG_WT |
| FEED CONVERSION | 1.93 | 1.94 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $163.00 | FEED_COST_PER_TON |
| PARTIAL CARCASS PRICE/LB | $0.50 | $0.50 | PARTIAL_CARCASS_PRICE_PER_LB |
| BREAST PRICE/LB | $0.00 | $0.00 | BREAST_PRICE_PER_LB |
| PERCENT CONDEMNED | 1.69% | 1.77% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 962.2 | 969 | NBR_BIRDS_PROCESSED |
| SELLING PRICE PER CHICKEN | 1.86 | 1.90 | CHICKEN_VALUE |
| RESULTING PRICE PER 1000 CHICKENS IN INITIAL POPULATION | $1,789.69 | $1,841.10 | CHICKEN_VALUE_PER_1000 |
| CONDEMNED CHICKEN VALUE PER 1000 | $30.25 | $32.59 | CONDEMNED_VALUE_PER_1000 |
| DIFFERENCE IN GROSS PROFITS PER 1000 | $1,759.44 | $1,808.51 | GROSS_PROFIT_PER_1000 |

FIG. 5B

CHICKEN PROCESSING STATISTICS

| DESCRIPTION | POPULATION A | POPULATION B | IDENTIFIER NAMES |
|---|---|---|---|
| FEED COST PER 1000 | $745.76 | $785.96 | FEED_COST_PER_1000 |
| EXTRA VALUE (COST) FOR THE ASSAYED CHICKEN GROWING AND PROCESSING FACTOR (PER 1000 CHICKENS) | --- | ($40.20) | FACTOR_VALUE_PER_1000 |
| GROSS PROFIT ADJUSTED FOR ASSAYED FACTOR (PER 1000 CHICKENS) | $1,759.44 | $1,768.31 | FACTOR_ADJUSTED_PROFIT |
| CHANGE IN GROSS PROFIT DUE TO ASSAYED FACTOR (PER 1000 CHICKENS) | --- | $49.07 | GROSS_PROFIT_CHANGE_FROM_FACTOR |
| NET PROFIT DUE TO ASSAYED FACTOR (PER 1000 CHICKENS) | --- | $8.87 | FACTOR_EFFECT |

FIG. 6A

CHICKEN PROCESSING STATISTICS

| DESCRIPTION | POPULATION A | POPULATION B | IDENTIFIER NAMES |
|---|---|---|---|
| MORTALITY | 4.08% | 4.57% | MORTALITY |
| AVG. WEIGHT (LBS) | 4.44 | 4.47 | AVG_WT |
| FEED CONVERSION | 1.99 | 1.98 | FEED_CONVERSION |
| PERCENT OF SALEABLE CHICKEN MEAT | 74.00% | 74.00% | PCT_SALEABLE_MEAT |
| PERCENT BREAST MEAT | $0.00 | $0.00 | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 1.10% | 1.14% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 959.2 | 954.3 | NBR_BIRDS_PROCESSED |
| SELLING PRICE PER CHICKEN | $1.64 | $1.65 | CHICKEN_VALUE |
| RESULTING PRICE PER 1000 CHICKENS IN INITIAL POPULATION | $1,573.09 | $1,574.60 | CHICKEN_VALUE_PER_1000 |

FIG. 6B

CHICKEN PROCESSING STATISTICS

| DESCRIPTION | POPULATION A | POPULATION B | IDENTIFIER NAMES |
|---|---|---|---|
| CONDEMNED CHICKEN VALUE PER 1000 | $17.30 | $17.95 | CONDEMNED_VALUE_PER_1000 |
| DIFFERENCE IN GROSS PROFITS PER 1000 | $1,555.79 | $1,556.65 | GROSS_PROFIT_PER_1000 |
| FEED COST PER 1000 | $678.01 | $675.69 | FEED_COST_PER_1000 |
| EXTRA VALUE (COST) FOR THE ASSAYED CHICKEN GROWING AND PROCESSING FACTOR (PER 1000 CHICKENS) | --- | $2.32 | FACTOR_VALUE_PER_1000 |
| GROSS PROFIT ADJUSTED FOR ASSAYED FACTOR (PER 1000 CHICKENS) | $1,555.79 | $1,558.97 | FACTOR_ADJUSTED_PROFIT |
| CHANGE IN GROSS PROFIT DUE TO ASSAYED FACTOR (PER 1000 CHICKENS) | --- | $0.86 | GROSS_PROFIT_CHANGE_FROM_FACTOR |
| NET PROFIT DUE TO ASSAYED FACTOR (PER 1000 CHICKENS) | --- | $3.18 | FACTOR_EFFECT |

FIG. 7A

CHICKEN PROCESSING STATISTICS

| DESCRIPTION | POPULATION A | POPULATION B | IDENTIFIER NAMES |
|---|---|---|---|
| MORTALITY | 4.58% | 3.64% | MORTALITY |
| AVG. WEIGHT (LBS) | 4.44 | 4.47 | AVG_WT |
| FEED CONVERSION | 2.01 | 1.97 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 1.10% | 1.07% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 954.2 | 963.6 | NBR_BIRDS_PROCESSED |
| SELLING PRICE PER CHICKEN | $1.64 | $1.65 | CHICKEN_VALUE |
| RESULTING PRICE PER 1000 CHICKENS IN INITIAL POPULATION | $1,564.89 | $1,589.94 | CHICKEN_VALUE_PER_1000 |

FIG. 7B

| CHICKEN PROCESSING STATISTICS | | | |
|---|---|---|---|
| DESCRIPTION | POPULATION A | POPULATION B | IDENTIFIER NAMES |
| CONDEMNED CHICKEN VALUE PER 1000 | $17.21 | $17.01 | CONDEMNED_VALUE_PER_1000 |
| DIFFERENCE IN GROSS PROFITS PER 1000 | $1,547.68 | $1,572.93 | GROSS_PROFIT_PER_1000 |
| FEED COST PER 1000 | $681.25 | $678.83 | FEED_COST_PER_1000 |
| EXTRA VALUE (COST) FOR THE ASSAYED CHICKEN GROWING AND PROCESSING FACTOR (PER 1000 CHICKENS) | --- | $2.42 | FACTOR_VALUE_PER_1000 |
| GROSS PROFIT ADJUSTED FOR ASSAYED FACTOR (PER 1000 CHICKENS) | $1,547.68 | $1,575.35 | FACTOR_ADJUSTED_PROFIT |
| CHANGE IN GROSS PROFIT DUE TO ASSAYED FACTOR (PER 1000 CHICKENS) | --- | $25.25 | GROSS_PROFIT_CHANGE_FROM_FACTOR |
| NET PROFIT DUE TO ASSAYED FACTOR (PER 1000 CHICKENS) | --- | $27.67 | FACTOR_EFFECT |

FIG. 8A

CHICKEN PROCESSING STATISTICS

| DESCRIPTION | POPULATION A | POPULATION B | IDENTIFIER NAMES |
|---|---|---|---|
| MORTALITY | 6.26% | 3.24% | MORTALITY |
| AVG. WEIGHT (LBS) | 4.38 | 4.44 | AVG_WT |
| FEED CONVERSION | 1.87 | 1.86 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 0.85% | 0.85% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 937.4 | 967.6 | NBR_BIRDS_PROCESSED |
| SELLING PRICE PER CHICKEN | $1.62 | $1.64 | CHICKEN_VALUE |
| RESULTING PRICE PER 1000 CHICKENS IN INITIAL POPULATION | $1,518.59 | $1,586.86 | CHICKEN_VALUE_PER_1000 |

FIG. 8B

CHICKEN PROCESSING STATISTICS

| DESCRIPTION | POPULATION A | POPULATION B | IDENTIFIER NAMES |
|---|---|---|---|
| CONDEMNED CHICKEN VALUE PER 1000 | $12.91 | $13.49 | CONDEMNED_VALUE_PER_1000 |
| DIFFERENCE IN GROSS PROFITS PER 1000 | $1,505.68 | $1,573.37 | GROSS_PROFIT_PER_1000 |
| FEED COST PER 1000 | $614.23 | $639.27 | FEED_COST_PER_1000 |
| EXTRA VALUE (COST) FOR THE ASSAYED CHICKEN GROWING AND PROCESSING FACTOR (PER 1000 CHICKENS) | --- | ($25.04) | FACTOR_VALUE_PER_1000 |
| GROSS PROFIT ADJUSTED FOR ASSAYED FACTOR (PER 1000 CHICKENS) | $1,505.68 | $1,548.33 | FACTOR_ADJUSTED_PROFIT |
| CHANGE IN GROSS PROFIT DUE TO ASSAYED FACTOR (PER 1000 CHICKENS) | --- | $67.69 | GROSS_PROFIT_CHANGE_FROM_FACTOR |
| NET PROFIT DUE TO ASSAYED FACTOR (PER 1000 CHICKENS) | --- | 42.65 | FACTOR_EFFECT |

FIG. 9A

CHICKEN PROCESSING STATISTICS

| DESCRIPTION | POPULATION A | POPULATION B | IDENTIFIER NAMES |
|---|---|---|---|
| MORTALITY | 6.26% | 6.00% | MORTALITY |
| AVG. WEIGHT (LBS) | 4.38 | 4.43 | AVG_WT |
| FEED CONVERSION | 1.87 | 1.86 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 0.85% | 0.85% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 937.4 | 940.0 | NBR_BIRDS_PROCESSED |
| SELLING PRICE PER CHICKEN | $1.62 | $1.64 | CHICKEN_VALUE |
| RESULTING PRICE PER 1000 CHICKENS IN INITIAL POPULATION | $1,518.59 | $1,541.60 | CHICKEN_VALUE_PER_1000 |

FIG. 9B

CHICKEN PROCESSING STATISTICS

| DESCRIPTION | POPULATION A | POPULATION B | IDENTIFIER NAMES |
|---|---|---|---|
| CONDEMNED CHICKEN VALUE PER 1000 | $12.91 | $13.10 | CONDEMNED_VALUE_PER_1000 |
| DIFFERENCE IN GROSS PROFITS PER 1000 | $1,505.68 | $1,528.50 | GROSS_PROFIT_PER_1000 |
| FEED COST PER 1000 | $614.23 | $620.18 | FEED_COST_PER_1000 |
| EXTRA VALUE (COST) FOR THE ASSAYED CHICKEN GROWING AND PROCESSING FACTOR (PER 1000 CHICKENS) | --- | ($5.95) | FACTOR_VALUE_PER_1000 |
| GROSS PROFIT ADJUSTED FOR ASSAYED FACTOR (PER 1000 CHICKENS) | $1,505.68 | $1,522.55 | FACTOR_ADJUSTED_PROFIT |
| CHANGE IN GROSS PROFIT DUE TO ASSAYED FACTOR (PER 1000 CHICKENS) | --- | $22.82 | GROSS_PROFIT_CHANGE_FROM_FACTOR |
| NET PROFIT DUE TO ASSAYED FACTOR (PER 1000 CHICKENS) | --- | $16.87 | FACTOR_EFFECT |

FIG. 10A

| CHICKEN PROCESSING STATISTICS | | | |
|---|---|---|---|
| DESCRIPTION | POPULATION A | POPULATION B | IDENTIFIER NAMES |
| MORTALITY | 6.26% | 5.98% | MORTALITY |
| AVG. WEIGHT (LBS) | 4.38 | 4.41 | AVG_WT |
| FEED CONVERSION | 1.87 | 1.88 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $0.00 | $1.50 | BREAST_PRICE_PER_LB |
| PERCENT CONDEMNED | 0.85% | 0.85% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 937.4 | 940.2 | NBR_BIRDS_PROCESSED |
| SELLING PRICE PER CHICKEN | $1.62 | $1.63 | CHICKEN_VALUE |
| RESULTING PRICE PER 1000 CHICKENS IN INITIAL POPULATION | $1,518.59 | $1,532.53 | CHICKEN_VALUE_PER_1000 |

FIG. 10B

CHICKEN PROCESSING STATISTICS

| DESCRIPTION | POPULATION A | POPULATION B | IDENTIFIER NAMES |
|---|---|---|---|
| CONDEMNED CHICKEN VALUE PER 1000 | $12.91 | $13.03 | CONDEMNED_VALUE_PER_1000 |
| GROSS PROFITS PER 1000 | $1,505.68 | $1,519.50 | GROSS_PROFIT_PER_1000 |
| FEED COST PER 1000 | $614.23 | $617.54 | FEED_COST_PER_1000 |
| EXTRA VALUE (COST) FOR THE ASSAYED CHICKEN GROWING AND PROCESSING FACTOR (PER 1000 CHICKENS) | --- | ($3.31) | FACTOR_VALUE_PER_1000 |
| GROSS PROFIT ADJUSTED FOR ASSAYED FACTOR (PER 1000 CHICKENS) | $1,505.68 | $1,516.19 | FACTOR_ADJUSTED_PROFIT |
| CHANGE IN GROSS PROFIT DUE TO ASSAYED FACTOR (PER 1000 CHICKENS) | --- | $13.82 | GROSS_PROFIT_CHANGE_FROM_FACTOR |
| NET PROFIT DUE TO ASSAYED FACTOR (PER 1000 CHICKENS) | --- | $10.51 | FACTOR_EFFECT |

FIG. 11A

CHICKEN PROCESSING STATISTICS

| DESCRIPTION | POPULATION A | POPULATION B | IDENTIFIER NAMES |
|---|---|---|---|
| MORTALITY | 6.26% | 4.75% | MORTALITY |
| AVG. WEIGHT (LBS) | 4.38 | 4.41 | AVG_WT |
| FEED CONVERSION | 1.87 | 1.87 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $0.00 | $1.50 | BREAST_PRICE_PER_LB |
| PERCENT CONDEMNED | 0.85% | 0.85% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 937.4 | 952.5 | NBR_BIRDS_PROCESSED |
| SELLING PRICE PER CHICKEN | $1.62 | $1.63 | CHICKEN_VALUE |
| RESULTING PRICE PER 1000 CHICKENS IN INITIAL POPULATION | $1,518.59 | $1,552.58 | CHICKEN_VALUE_PER_1000 |

FIG. 11B

| CHICKEN PROCESSING STATISTICS | | | |
|---|---|---|---|
| DESCRIPTION | POPULATION A | POPULATION B | IDENTIFIER NAMES |
| CONDEMNED CHICKEN VALUE PER 1000 | $12.91 | $13.20 | CONDEMNED_VALUE_PER_1000 |
| DIFFERENCE IN GROSS PROFITS PER 1000 | $1,505.68 | $1,539.38 | GROSS_PROFIT_PER_1000 |
| FEED COST PER 1000 | $614.23 | $628.98 | FEED_COST_PER_1000 |
| EXTRA VALUE (COST) FOR THE ASSAYED CHICKEN GROWING AND PROCESSING FACTOR (PER 1000 CHICKENS) | --- | ($14.75) | FACTOR_VALUE_PER_1000 |
| GROSS PROFIT ADJUSTED FOR ASSAYED FACTOR (PER 1000 CHICKENS) | $1,505.68 | $1,524.63 | FACTOR_ADJUSTED_PROFIT |
| CHANGE IN GROSS PROFIT DUE TO ASSAYED FACTOR (PER 1000 CHICKENS) | --- | $33.70 | GROSS_PROFIT_CHANGE_FROM_FACTOR |
| NET PROFIT DUE TO ASSAYED FACTOR (PER 1000 CHICKENS) | --- | $18.95 | FACTOR_EFFECT |

FIG. 12A

CHICKEN PROCESSING STATISTICS

| DESCRIPTION | POPULATION A | POPULATION B | IDENTIFIER NAMES |
|---|---|---|---|
| MORTALITY | 10.82% | 8.51% | MORTALITY |
| AVG. WEIGHT (LBS) | 5.61 | 5.71 | AVG_WT |
| FEED CONVERSION | 1.99 | 1.99 | FEED_CONVERSION |
| PERCENT OF SALEABLE CHICKEN MEAT | 74.00% | 74.00% | PCT_SALEABLE_MEAT |
| PERCENT BREAST MEAT | 20.68% | 20.98% | PCT_BREAST_YLD |
| FEED COST/TON | $200.00 | $202.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 0.00% | 0.00% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 891.8 | 914.9 | NBR_BIRDS_PROCESSED |
| SELLING PRICE PER CHICKEN | $2.93 | $3.00 | CHICKEN_VALUE |
| RESULTING PRICE PER 1000 CHICKENS IN INITIAL POPULATION | $2,612.97 | $2,744.70 | CHICKEN_VALUE_PER_1000 |

FIG. 12B

| CHICKEN PROCESSING STATISTICS | | | |
|---|---|---|---|
| DESCRIPTION | POPULATION A | POPULATION B | IDENTIFIER NAMES |
| CONDEMNED CHICKEN VALUE PER 1000 | $0.00 | $0.00 | CONDEMNED_VALUE_PER_1000 |
| DIFFERENCE IN GROSS PROFITS PER 1000 | $2,612.97 | $2,744.70 | GROSS_PROFIT_PER_1000 |
| FEED COST PER 1000 | $995.60 | $1,049.99 | FEED_COST_PER_1000 |
| EXTRA VALUE (COST) FOR THE ASSAYED CHICKEN GROWING AND PROCESSING FACTOR (PER 1000 CHICKENS) | --- | ($54.39) | FACTOR_VALUE_PER_1000 |
| GROSS PROFIT ADJUSTED FOR ASSAYED FACTOR (PER 1000 CHICKENS) | $2,612.97 | $2,690.31 | FACTOR_ADJUSTED_PROFIT |
| CHANGE IN GROSS PROFIT DUE TO ASSAYED FACTOR (PER 1000 CHICKENS) | --- | $131.73 | GROSS_PROFIT_CHANGE_FROM_FACTOR |
| NET PROFIT DUE TO ASSAYED FACTOR (PER 1000 CHICKENS) | --- | $77.34 | FACTOR_EFFECT |

FIG. 13A

TURKEY PROCESSING STATISTICS

| DESCRIPTION | POPULATION A | POPULATION B | IDENTIFIER NAMES |
|---|---|---|---|
| MORTALITY | 7.10% | 5.50% | MORTALITY |
| AVG. WEIGHT (LBS) | 25.48 | 26.41 | AVG_WT |
| FEED CONVERSION | 2.68 | 2.63 | FEED_CONVERSION |
| PERCENT OF SALEABLE TURKEY MEAT | 74.00% | 74.00% | PCT_SALEABLE_MEAT |
| PERCENT BREAST MEAT | 27.00% | 27.91% | PCT_BREAST_YLD |
| FEED COST/TON | $200.00 | $203.00 | FEED_COST_PER_TON |
| PARTIAL CARCASS PRICE/LB | $0.70 | $0.70 | PARTIAL_CARCASS_PRICE_PER_LB |
| BREAST PRICE/LB | $2.00 | $2.00 | BREAST_PRICE_PER_LB |
| PERCENT CONDEMNED | 0.00% | 0.00% | PCT_CONDEMNED |
| NUMBER TURKEYS (EGGS) IN POPULATION | 1000 | 1000 | NBR_BIRDS |
| NUMBER TURKEYS TO PROCESSING PLANT PER 1000 | 929 | 945 | NBR_BIRDS_PROCESSED |
| SELLING PRICE PER TURKEY | $19.81 | $20.77 | BIRD_VALUE |
| RESULTING PRICE PER 1000 TURKEYS IN INITIAL POPULATION | $18,407.63 | $19,626.01 | BIRD_VALUE_PER_1000 |

FIG. 13B

TURKEY PROCESSING STATISTICS

| DESCRIPTION | POPULATION A | POPULATION B | IDENTIFIER NAMES |
|---|---|---|---|
| CONDEMNED TURKEY VALUE PER 1000 | $0.00 | $0.00 | CONDEMNED_VALUE_PER_1000 |
| DIFFERENCE IN GROSS PROFITS PER 1000 | $18,407.63 | $19,626.01 | GROSS_PROFIT_PER_1000 |
| FEED COST PER 1000 | $6,343.05 | $6,661.29 | FEED_COST_PER_1000 |
| EXTRA VALUE (COST) FOR THE ASSAYED TURKEY GROWING AND PROCESSING FACTOR (PER 1000 TURKEYS) | --- | ($318.24) | FACTOR_VALUE_PER_1000 |
| GROSS PROFIT ADJUSTED FOR ASSAYED FACTOR (PER 1000 TURKEYS) | $18,407.63 | $19,307.77 | FACTOR_ADJUSTED_PROFIT |
| CHANGE IN GROSS PROFIT DUE TO ASSAYED FACTOR (PER 1000 TURKEYS) | --- | $1,218.38 | GROSS_PROFIT_CHANGE_FROM_FACTOR |
| NET PROFIT DUE TO ASSAYED FACTOR (PER 1000 TURKEYS) | --- | $900.14 | FACTOR_EFFECT |

FIG. 14A

TURKEY PROCESSING STATISTICS

| DESCRIPTION | POPULATION A | POPULATION B | IDENTIFIER NAMES |
|---|---|---|---|
| MORTALITY | 10.21% | 5.50% | MORTALITY |
| AVG. WEIGHT (LBS) | 25.48 | 25.88 | AVG_WT |
| FEED CONVERSION | 2.68 | 2.67 | FEED_CONVERSION |
| PERCENT OF SALEABLE TURKEY MEAT | 74.00% | 74.00% | PCT_SALEABLE_MEAT |
| PERCENT BREAST MEAT | 27% | 27.91% | PCT_BREAST_YLD |
| FEED COST/TON | $200.00 | $220.00 | FEED_COST_PER_TON |
| PARTIAL CARCASS PRICE/LB | $0.70 | $0.70 | PARTIAL_CARCASS_PRICE_PER_LB |
| BREAST PRICE/LB | $2.00 | $2.00 | BREAST_PRICE_PER_LB |
| PERCENT CONDEMNED | 0.00% | 0.00% | PCT_CONDEMNED |
| NUMBER TURKEYS (EGGS) IN POPULATION | 1000 | 1000 | NBR_BIRDS |
| NUMBER TURKEYS TO PROCESSING PLANT PER 1000 | 897.9 | 945 | NBR_BIRDS_PROCESSED |
| SELLING PRICE PER TURKEY | $19.81 | $20.35 | BIRD_VALUE |

FIG. 14B

| TURKEY PROCESSING STATISTICS | | | |
|---|---|---|---|
| DESCRIPTION | POPULATION A | POPULATION B | IDENTIFIER NAMES |
| RESULTING PRICE PER 1000 TURKEYS IN INITIAL POPULATION | $17,791.40 | $19,232.45 | BIRD_VALUE_PER_1000 |
| CONDEMNED TURKEY VALUE PER 1000 | $0.00 | $0.00 | CONDEMNED_VALUE_PER_1000 |
| DIFFERENCE IN GROSS PROFITS PER 1000 | $17,791.40 | $19,232.45 | GROSS_PROFIT_PER_1000 |
| FEED COST PER 1000 | $6,130.70 | $7,181.96 | FEED_COST_PER_1000 |
| EXTRA VALUE (COST) FOR THE ASSAYED TURKEY GROWING AND PROCESSING FACTOR (PER 1000 TURKEYS) | --- | ($1,051.26) | FACTOR_VALUE_PER_1000 |
| GROSS PROFIT ADJUSTED FOR ASSAYED FACTOR (PER 1000 TURKEYS) | $17,791.40 | $18,181.19 | FACTOR_ADJUSTED_PROFIT |
| CHANGE IN GROSS PROFIT DUE TO ASSAYED FACTOR (PER 1000 TURKEYS) | --- | $1,441.05 | GROSS_PROFIT_CHANGE_FROM_FACTOR |
| NET PROFIT DUE TO ASSAYED FACTOR (PER 1000 TURKEYS) | --- | $389.79 | FACTOR_EFFECT |

ANIMAL PROCESSING ASSAY SYSTEM

CROSS-REFERENCE TO RELATED INVENTIONS

The present application is a continuation-in-part of U.S. patent application Ser. No. 08/632,796, filed Apr. 17, 1996, entitled "ANIMAL FEED SYSTEM," now U.S. Pat. No. 5,715,185.

FIELD OF THE INVENTION

The present invention is directed to an assay and method for determining the efficacy of various factors relating to the growing and processing system of food animals and animal by-products having more than one of the following growing and processing components: a breeder farm, a hatchery, a grow-out facility, an animal (or animal by-product) transportation capability, and an animal (or animal by-product) processing plant. More particularly, the present invention is related to an assay and method for determining the efficacy of various factors relating to the growing and processing of fowl.

BACKGROUND OF THE INVENTION

Industries for processing food animals and animal by-products are segmented into a number of distinct types of business units or organizational components with the components of each type concerned with a narrow aspect of animal (or animal by-product) production. For example, FIG. 1 shows a fowl growing and processing system (such as those used for growing and processing of chickens, turkeys, geese, pheasants, ducks, quail, game hens, pigeons, emus, ostriches, etc.), commencing with the breeding of the birds and ending with the packaging of bird meat, wherein the double lined arrows indicate the flow of birds through the bird growing and processing system and the single arrows indicate the flow of bird feed. That is, FIG. 1 includes the following distinct types of bird growing and processing components:

(1.1) One or more bird breeder farms 20 for the breeding of broiler birds;

(1.2) One or more bird hatcheries 24 that receive fertilized eggs from the breeder farms 20 and hatch bird chicks from the eggs;

(1.3) One or more broiler grow-out facilities 28 for receiving bird chicks from the hatcheries 24 and growing the bird chicks into birds having an appropriate weight for processing into saleable bird meat;

(1.4) A feed mill 32 for supplying bird feed to the breeder farms 20, the hatcheries 24 and the broiler grow-out facilities 28;

(1.5) A processing plant 36 for receiving birds from the grow-out facilities 28 and providing bird meat for distribution; and (1.6) A bird catching and hauling component 40 for catching and transporting birds from the grow-out facilities 28 to the processing plant 36.

Each of the above-discussed bird growing and processing components 20–40 are typically operated as individual profit centers. Accordingly, each such component is primarily concerned with increasing its own cost-effectiveness. In addressing such concerns, each manager operating one of the bird growing and processing components typically strives to lower the component's individual operating costs and still provide an "adequate" product to client bird growing and processing components. For example, the feed mill 32 may modify the composition of bird feed to lower its costs to the grow-out facilities 28. Or, a breeder farm 20 may reduce certain bird feed nutrients that does not decrease the number of fertilized eggs provided to a hatchery 24, but the mortality rate of the hatched bird chicks may increase, or, for example, a broiler grow-out facility 28 may reduce feed additives fed to its birds just enough so that the birds remain minimally healthy at the grow-out facility 28, but many may die while being transported to the processing plant 36.

Accordingly, the bird growing and processing industry as a whole currently has a reduced efficiency and profits due to such shortsighted practices as described above. Further, such shortsightedness is reinforced due substantially to the lack of a bird growing and processing analysis model and method that allows for a determination of the economic impact various factors have in affecting the quantity and/or quality of saleable bird meat from a bird growing and processing system as a whole.

Thus, it would be advantageous to various animal and animal by-product growing and processing industries to have a method and system for modeling their growing and processing systems, such as those of FIG. 1 so that variations in such a system may be detected and/or evaluated to determine their economic impact.

Additionally, note that similar organizational structures and concomitant problems may occur in the processing of quail, eggs, cattle, hogs and sheep.

SUMMARY OF THE INVENTION

The present invention is a model and system for assaying changes to a procedure or practice used in growing and processing of animals and animal by-products as food, wherein the term "animal and animal by-product growing and processing" or simply "animal (and animal by-product) processing" herein is used to mean a procedure or practice including at least some of: breeding, hatching, raising, transporting and processing animals and their by-products (e.g., eggs) into saleable edible products. That is, the present invention provides a method and system for assaying the impact of various changes to factors affecting one or more of the following components of an animal (by-product) growing and processing system: an animal breeding component, an animal hatching component, an animal growing component, an animal transporting component and/or a component for processing animals (by-products) into saleable edible products, wherein the assay determines the effect of the factor on the entire animal (by-product) growing and processing system. Said another way, the present invention provides an analysis of such factor changes according to how they impact a characteristic of saleable edible animal products which is output by a growing and processing system such as the fowl growing and processing system as shown in FIG. 1.

Moreover, it is an object of the present invention that animal or animal by-product growing and processing system assays provided by the present invention may be applied to a wide variety of growing and processing influencing factors. For example, such factors may include a substance consumable by the animals (e.g., bird feed, feed additives and drugs), an animal growing and processing environmental characteristic (e.g., a temperature, a humidity, a number of hours of light, an audible stimulus (or lack thereof) and size of the animal enclosure), and a genetic characteristic of the animals (e.g., a breed of turkeys that yield a greater percentage of breast meat).

In order to provide an assay of the impact of an animal (by-product) growing and processing system influencing factor, the present invention provides a novel model of such growing and processing systems such as that disclosed in FIG. 1, wherein the model provides reliable analyses and predictions as to the effect of the factor upon a characteristic of saleable edible animal products, and in particular, upon a characteristic for indicating the cost effectiveness of the growing and processing system as a whole. This model yields a plurality of statistical measurements: (a) for measuring an impact of a growing and processing factor change, and (b) for measuring characteristics of saleable edible animal products. In particular, the model determines statistical measurements relating to: (a) the price of saleable animal products, (b) the number and value of the animal products processed at a processing plant (e.g., processing plant 36), (c) the number and value of the animal (by-products) not processed into saleable edible products, (d) the weight of the animal (by-product) at the processing plant, (e) the cost of feeding the animals, (f) any additional changes in animal growing and processing overhead attributable to the factor change is not taken into account in the above statistics, and (g) the profit resulting from the animal (by product) growing and processing system.

The present invention is particularly applicable to the production of chicken and turkey meat products in that the growing of both types of animals for meat is very similar. That is, the growing and processing industries for both types of birds are substantially integrated into an organizational structure as shown in FIG. 1. Accordingly, for turkeys, there is a hatchery 24, a feed mill 32, a grow-out component 28, a catching and hauling component 40, and a processing plant 36. Furthermore, turkey meat is sold to the consumer as the sole source of cash income for a turkey processing company having the organizational structure of FIG. 1.

As with chickens, the turkey growing and processing industry is always concerned with the cost of production. Turkeys are grown for a period of 90 to 210 days. Female turkeys are grown from 90 to 125 days, and male turkeys are grown from 100 to 210 days. Turkeys are processed and sold as whole birds, as well as with a certain number of birds being processed alternatively as turkey breast meat. Turkey meat is also processed into other meat products such as turkey ham, turkey bacon, ground turkey, etc. Thus, with the wide applicability of such meats grown in high volumes, it is advantageous to have a way to correctly value any changes to the cost of production. Thus, changes made in the entire production cycle, from, for example, producing the turkey hatching egg to the selection of a feeding system, can affect the economic value of the meat and the quantity of meat produced by a turkey growing and processing system. The present invention provides an assay technique for determining the economic value of any processing decision made in the growing and processing production cycle. Accordingly, the results of such an assay can give turkey processing managers great help in deciding which changes are most cost effective. In one embodiment of the present invention, the economic parameters in the production of turkey meat provide the necessary information that turkey growing and processing management need to determine how to enhance the financial return obtained from turkey meat production.

Accordingly, it is an aspect of the present invention to compare the results from at least two applications of the above-described model for the same animal (by-product), each application using information obtained from processing a different population or collection of animals (or animal by-products) wherein substantially the only pertinent change in the processing between these two populations is the change in the factor being assayed. More particularly, the present invention determines a change in the cost effectiveness of the growing and processing system due the change in the factor being assayed.

Thus, the present invention provides a novel method and system for accurately assaying the effect of an animal (by-product) growing and processing influencing factor. Further, this results in the present invention being an effective predictor as to the cost effectiveness of continuing, expanding, eliminating and/or propagating growing and processing factor changes that heretofore would not have been contemplated due to the lack of an effective model for predicting a likely outcome resulting from such a change. Additionally, the prediction capabilities of the present invention can yield unanticipated benefits to those skilled in the art of animal (by-product) growing and processing in that the present invention quantifies the effects of growing and processing influencing factors for a growing and processing system (such as the system of FIG. 1) as a whole where there has been no previous capability of performing such an analysis.

Other features and benefits of the present invention will become apparent from the detailed description with the accompanying figures contained hereinafter.

BRIEF DESCRIPTION OF THE DRAWINGS

FIGS. 3A–3D provide a description of the steps performed in modeling the fowl growing and processing system of FIG. 1 to determine statistics related to the fowl growing and processing system of FIG. 1 as a whole. In particular, this flowchart provides statistics related to one or more characteristics of saleable bird meat;

FIGS. 5A and 5B illustrate a report output from the flowchart of FIG. 4 for comparing two populations of chickens processed by the chicken growing and processing system of FIG. 1, wherein the statistics of the column headed "POPULATION A" were obtained from a chicken population not provided with the feed additive, natamycin, and where the statistics of the column identified by "POPULATION B" is for a population of chickens provided with this feed additive;

FIGS. 6A and 6B illustrate an output from FIG. 4 comparing the statistics derived from two different populations of chickens processed by the chicken growing and processing system of FIG. 1, wherein the statistics from the column identified by "POPULATION A" were obtained from a chicken population not subject to the substance, aflatoxin, and wherein the statistics from the column identified as "POPULATION B" were obtained from a different chicken population that was subjected to this substance;

FIGS. 7A and 7B illustrate a report output from FIG. 4 for two populations of chickens processed by the chicken growing and processing system of FIG. 1 wherein the cost effectiveness of two different kinds of chicken feeding mechanisms are compared;

FIGS. 8A and 8B illustrate an output report from FIG. 4 providing statistics comparing the processing of a control chicken population to a chicken population that was fed a chicken medication conformed into "plates" produced by a first manufacturer;

FIGS. 9A and 9B illustrate an output report from FIG. 4 providing statistics for comparing the processing of a control population of chickens with a chicken population fed a "plate" conformed chicken medication from a second manufacturer different from the first manufacturer analyzed in FIGS. 8;

FIGS. 10A and 10B illustrate an output report from FIG. 4 for comparing the statistics of a control population of chickens fed a conventional chicken feed and a second population of chickens fed a chicken feed having a chicken medication manufactured in the form of "needles";

FIGS. 11A and 11B illustrate an output report from FIG. 4 for two populations of chickens processed by a chicken growing and processing system, wherein one population of chickens is a control population fed conventional chicken feed and a second population of chickens was fed chicken feed having a chicken medication in the form of "plates," wherein the "plate" medicated chicken feed here has the same composition as the "needle" medicated chicken feed composition analyzed in FIGS. 10;

FIGS. 12A and 12B illustrate an output report from FIG. 4 for two populations of chickens processed by a chicken growing and processing system, wherein one population of chickens is a control population fed conventional chicken feed and a second population of chickens was fed a chicken feed mixed with a special granular mineral compound;

FIGS. 13A and 13B illustrate an output report from the process described in FIG. 4 for two populations of turkeys processed by a turkey growing and processing system, wherein one population of turkeys is a control population fed conventional turkey feed and a second population of turkeys is fed a turkey feed mixed with a growth promoter; and FIGS. 14A and 14B illustrate an output report from the process described in FIG. 4 for two populations of turkeys processed by a turkey growing and processing system, wherein one population of turkeys is a control population fed conventional turkey feed and a second population of turkeys is fed a turkey feed mixed with a compound which presumably inhibits the mortality of turkeys prior to slaughter.

DETAILED DESCRIPTION

The present invention will be illustrated using a conventional fowl growing and processing system such as that used for growing chickens, turkeys, geese, etc. More particularly, the present invention will be illustrated for a chicken growing and processing system. However, it is within the scope of the present invention to apply the invention to other animal growing and processing systems such as those for cattle, sheep and hogs. Moreover, the present invention can be used for assaying animal by-product processing systems. For example, the systems for production and packaging of eggs can be assayed using embodiments of the present invention.

Figure 1:
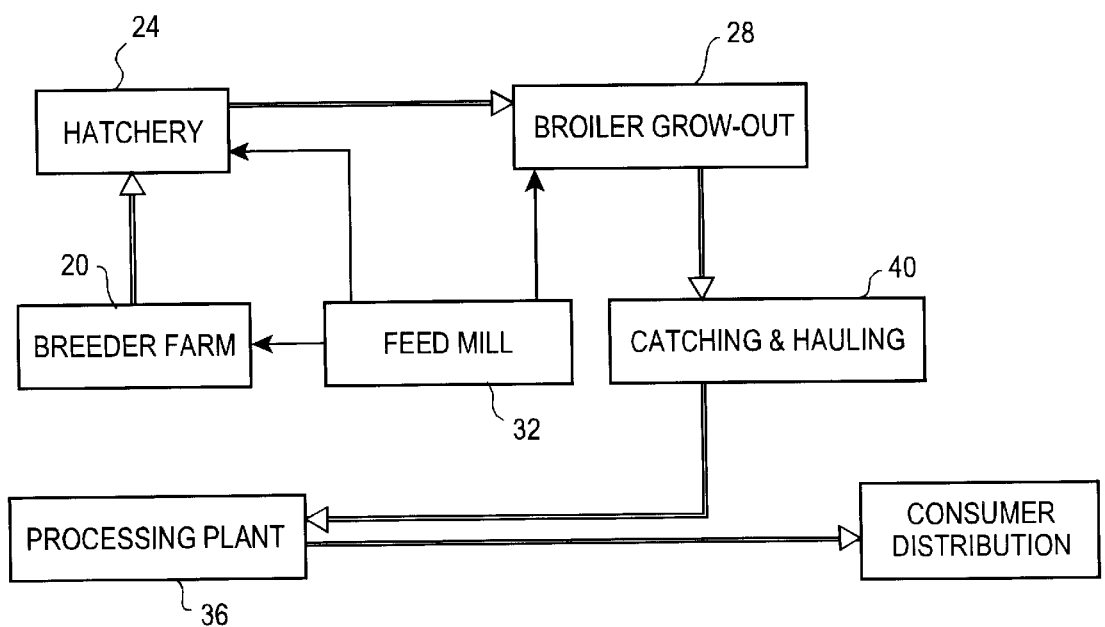
FIG. 1 is a block diagram of the business units or components involved in breeding, hatching, raising, transporting and processing birds to obtain saleable meat.
Figure 2:
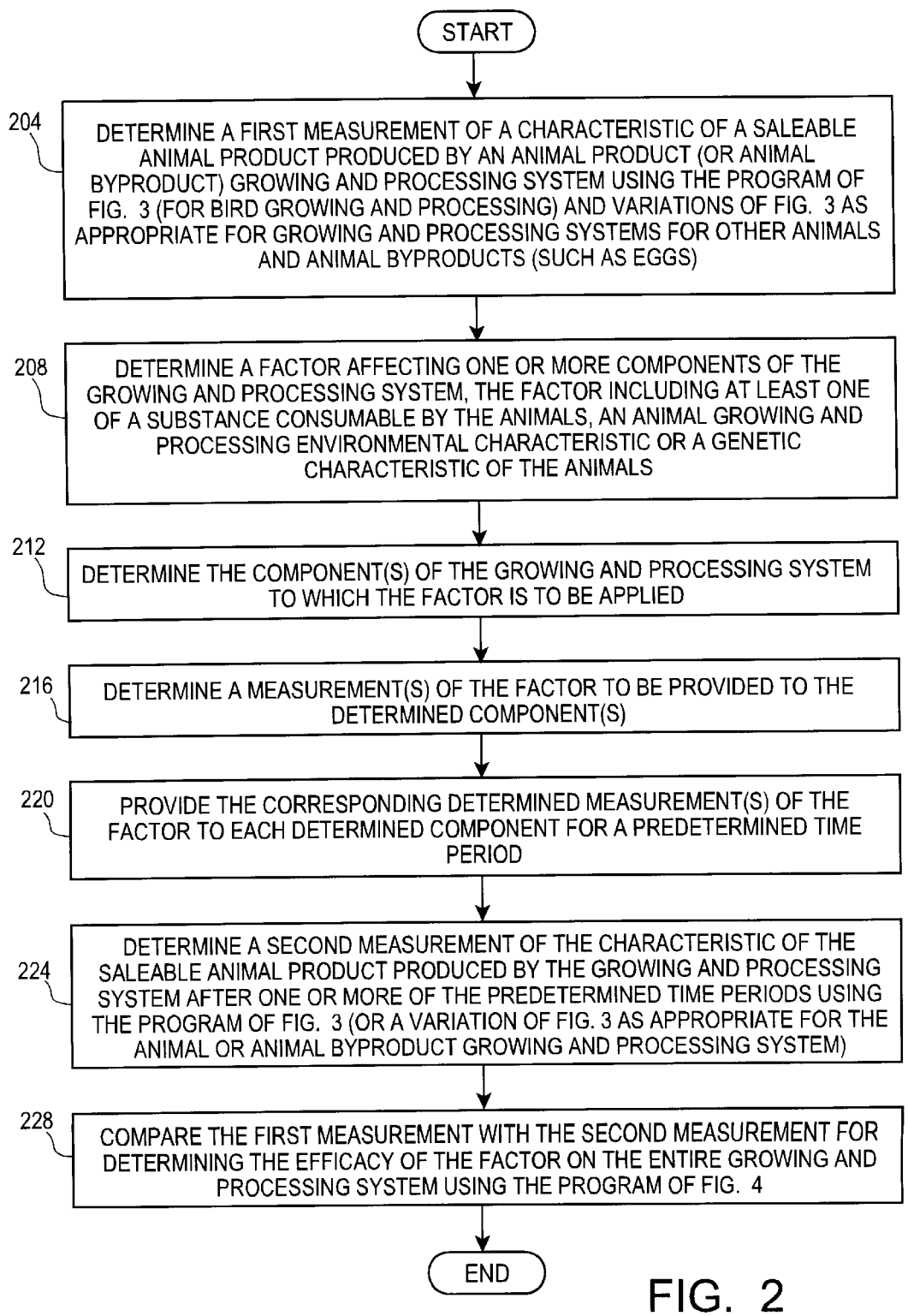
FIG. 2 is a high-level flowchart of the steps performed in the present invention for assaying the effect of a factor related to the components 20–36 of the fowl growing and processing system of FIG. 1.
Figure 3A:
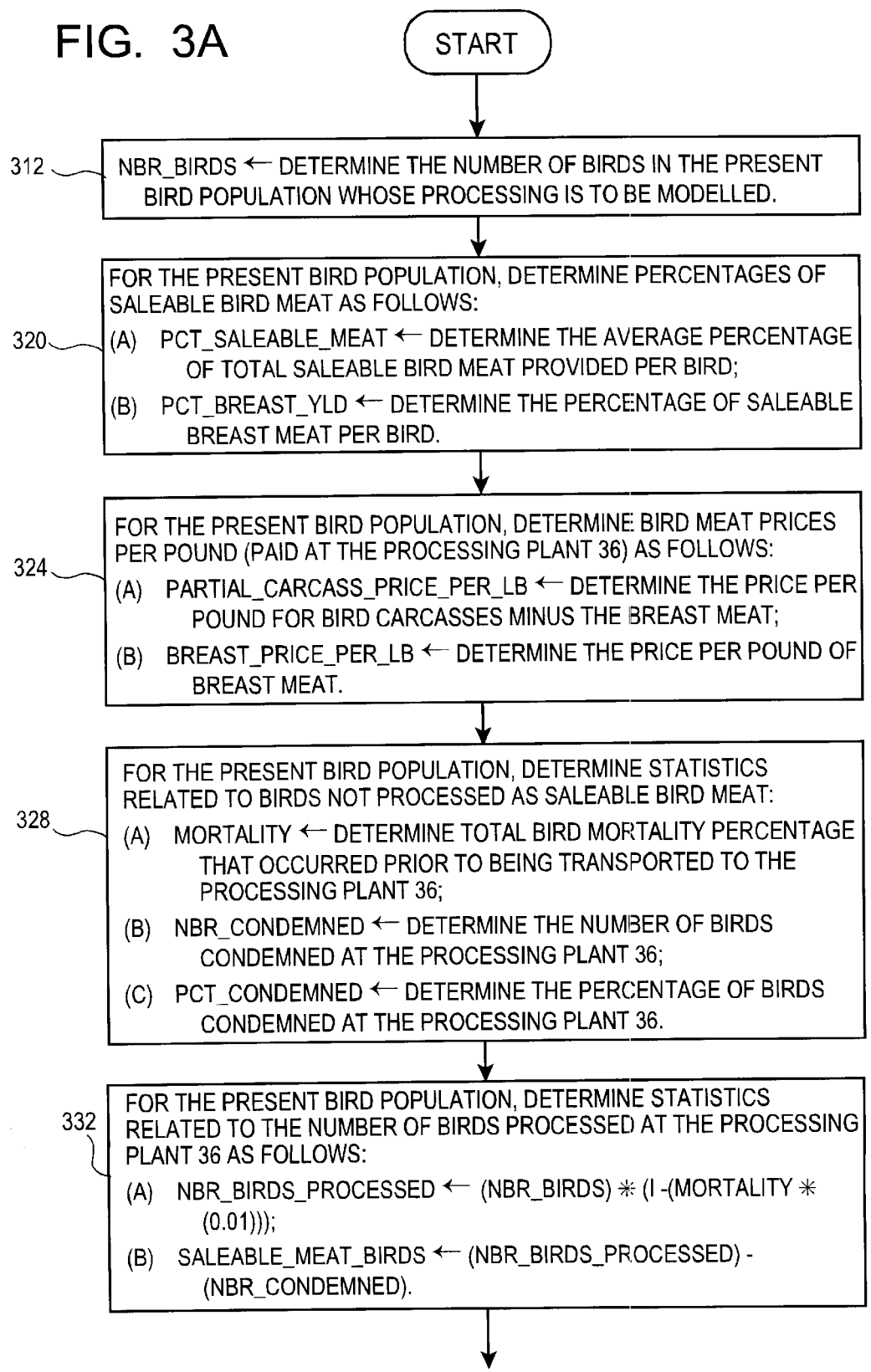

FIG. 2 presents a high level flowchart of the steps of the present invention for assaying the impact of a factor effecting an animal (or animal by-product) growing and processing system such as in FIG. 1 discussed above. Accordingly, in step 204, a measurement is determined of a first characteristic of a saleable animal product produced by a growing and processing system. It is important to note that the measurement of a characteristic of the saleable animal product referred to in this step may be any one of a plurality of measurements and/or characteristics. For example, for fowl, this (first) measurement may be one of: price per pound of a bird's breast meat, a total dollar amount for saleable bird meat processed from a given population of birds, a quality of saleable bird meat, a quantity of saleable bird meat, a measurement of the tenderness or uniformity of size of bird breast meat, the percentage of fat in saleable bird meat, and the amount of drugs or toxins within saleable bird meat. Further note, regarding this step, the determination of this first measurement of a characteristic of a saleable animal product is provided using a novel model of the growing and processing system for animals and animal by-products, assuming the system substantially reflects the organizational structure of FIG. 1. In particular, for bird growing and processing, this model is embodied in the flowchart of FIGS. 3A–3D.

Subsequently, in step 208, the assay method and system of the present invention allows a user to determine a factor affecting the animal (by-product) growing and processing system. In particular, the present invention is useful when the factor to be assayed is used by more than one of the growing and processing components (such as components 20–36 of FIG. 1). Further note that a wide range of factors may be determined in the present step. For example, it is within the scope of the present invention that the determined factor may include at least one of the following: a substance consumable by the animals being grown, an animal growing and processing environmental characteristic, or a genetic characteristic of the animals. Additionally, it is within the scope of the present invention that the determined factor may be a composite of other factors such as a factor that is a combination of certain animal feed additives such as feed additives and nutrients, or, humidity and nutrients.

In step 212, a determination is made regarding the components of the growing and processing system (e.g., components such as a hatchery, a breeder farm, a grow-out component, an animal transportation component, and or an animal processing plant) to which the factor determined in step 208 is to be applied. Thus, for example, if the factor to be applied includes one or more additives to the animal feed, then one preferred embodiment of the present assay is to provide the animal feed with the determined factor to animals at a breeder farm component (e.g., component 20 of FIG. 1), a hatchery component (e.g., component 24 of FIG. 1), and a grow-out component (e.g., component 28 of FIG. 1). Thus, if the factor is beneficial to the growing and processing system, then in most cases, the longer the factor is applied to an animal population, the more cost effective the factor will appear when the animals and/or their by-products are processed. For example, note that since the processing time of a generation of chickens within a chicken growing and processing system (organized as in FIG. 1) is approximately 40 to 50 days, this range of time typically provides a lower bound on the length of time to which the factor is to be applied to the chicken growing and processing system.

In step 216, a determination is made regarding the amount or measurement of the factor determined in step 212 that is to be applied to one or more of the growing and processing components to which the factor is to be applied. Note that it is within the scope of the present invention to apply different amounts of the determined factor to different components (e.g., components 20–36) within the growing and processing system. In the growing and processing of chickens, for example, a feed additive added to the chicken feed may be provided in different concentrations for the breeder farm 20, the hatchery 24 and the broiler grow-out 28. Further note that step 216 may be unnecessary in some growing and processing system assays. For example, if the assay compares two different breeds of animals using the steps of FIG. 2, then step 216 may be trivial. That is, the factor (i.e., the genetics of the two different populations being separately assayed) is presumably either entirely of one breed of animal or entirely of a different breed of the same animal. It is also worthwhile to note that factors of a quite different nature may be assayed with the present invention whereby step 216 may be unnecessary. For example, if the assay of the present invention is used to determine the net effect on a growing and processing system such as that of FIG. 1 when different types of mechanical animal feeders are tested, then it is likely that the comparisons will be between the use of entirely one type of animal feeder in a first measurement of a characteristic of saleable edible products, and a different kind of animal feeder in another measurement of the characteristic of saleable edible products.

In step 220, the determined factor is provided to the components of the growing and processing system to which the factor is to be applied for a predetermined period of time. In one embodiment of the present invention, the factor may be applied to each determined component of the growing and processing system simultaneously. In this case, the effect of the factor may be measured according to the length of time different aged animals are exposed to the measurement(s) of the factor as provided in step 220. For example, if the growing and processing system is for chickens and the factor is a chicken feed composition change or a medication added to the chickens' water, wherein the factor is applied to the (chicken) hatchery 34 and the broiler grow-out 28, then the chickens currently in the hatchery 34 will be preferably exposed to the factor adjusted feed or water substantially their entire lives, whereas those chickens currently in the boiler grow-out 28 and nearing an age for processing at the processing plant 36 will be exposed to the factor adjusted chicken feed or water for only a short time.

In an alternative embodiment of step 220, instead of the determined factor being applied for a predetermined period of time, for certain factors a time period may be irrelevant. That is, certain factors may be simply either applied or not applied. For example, certain medications may be either applied to the animals (and/or their embryos), thereby providing long-term effects to the animals, or not applied at all. Thus, one group of animals (or their embryos) may be exposed to the determined factor at a particular time in their lives, whereas another group of animals may not be exposed at all. Accordingly, an alternative description of step 220 that can be used in place of the description in FIG. 2, is as follows: "Provide the corresponding determined measurements of the factor to the animals at a particular time in the predetermined time the animals are in the growing and processing system."

However, other strategies for providing the determined factor to the components of a growing and processing system are also within the scope of the present invention. In particular, the factor may be applied only to a predetermined animal population. Thus, as this population moves from one component to another the factor is applied at different times to the components, according to the animal population(s) currently residing at the component. Additionally, note that as discussed above, the predetermined period of time will typically have a lower bound of the length of time the animals or their by-products are exposed to the factor. Note that for growing and processing chickens into saleable edible chicken meat, this period of time is 40 to 50 days.

Further, in another alternative method for assaying the factor, it has been determined that reliable measurements of the impact of the factor may be obtained by establishing the predetermined period of time, T, at approximately three times the length of time that it takes for an animal or its by-product to move through a growing and processing systems according to the present invention. For a chicken growing and processing system, this period is 21 weeks, and for turkeys, it is 9 to 21 months. That is, for growing and processing animals into saleable edible products, assuming the factor is provided to all the animals (regardless of their ages) concurrently during the first T/3 time, then the animals processed throughout this first T/3 period have been provided with the factor a progressively longer amount of time until at the end of this first T/3 time, the animals processed (e.g., for chickens, processed into saleable chicken meat) at the processing plant 36 will have been provided with the factor their entire lives. Subsequently, for the second T/3 time period, all animals processed at, for example, the processing plant 36 will have been provided with the factor their entire lives. Thus, this second T/3 time period becomes a steady state scenario for providing the factor. Finally, in the third T/3 time period, the factor may be withheld from all the animals simultaneously. Accordingly, the animals processed during this last T/3 time period will have been provided with the factor a progressively lesser amount of time until at the end of this time period, the animals processed at the processing plant 36 will not have been provided with the factor.

In yet another alternative method of assaying an animal or animal by-product growing and processing affecting factor, if there is a plurality of each of the components such as the hatchery 24 and the broiler grow-out 28, then a control population of animals and a factor provided population of animals may be grown in parallel in duplicate but identical (modulo any factor induced changes) hatcheries and broiler grow-out components. Of course, this same technique also applies to other components of growing and processing systems for animals or their by-products. Thus, for cattle, instead of hatcheries and broiler grow-out components, birthing areas (e.g., the range) and feed lots may be considered as the appropriate components. Thus, for example, referring to FIG. 1 components, a first hatchery 24 and broiler grow-out 28 would provide the factor to their animals (birds) while concurrently a second hatchery 24 and broiler grow-out 28 would not provide their animals (the control population(s)) with the factor.

In step 224 of FIG. 2, a second measurement of the characteristic of the saleable edible products produced by the growing and processing system is determined using the same model of the growing and processing system as was used in step 204 (the model being embodied in the flowchart of FIG. 3A–3D for growing and processing birds into saleable edible products).

Finally, in step 228, a comparison is made between the first measurement and the second measurement of the characteristic of the saleable edible products to determine the efficacy of the factor on the entire animal growing and processing system.

Note, however, that other embodiments and/or sequencing of the assay steps of FIG. 2 are also within the scope of the present invention. In particular, steps 204 and 224 may be performed substantially concurrently after a control animal population and a factor treated animal population are grown in parallel as discussed hereinabove.

FIGS. 3A–3D is an example of a flowchart of the steps performed in modeling an entire growing and processing system such as that of FIG. 1 to determine the impact of the factor determined in step 208 of FIG. 2. Accordingly, FIGS. 3A–3D is invoked a first time for modeling a fowl growing and processing system before applying the factor to be assayed, and again after the determined factor has been applied for a predetermined amount of time. Further, in one preferred embodiment of the present assay method and system, the first and second invocations of the model embodied by FIGS. 3A–3D are performed on two different bird populations. Thus, if the determined factor of FIG. 2 (step 208) is substantially the only change in the fowl growing and processing system between the two populations of birds, then the impact of the factor is provided by the statistics which result form the performance of the fowl growing and processing model of the present invention embodied in the flowchart of FIGS. 3A–3D.

Assuming now that the flowchart of FIGS. 3A–3D is invoked with the measurements related to one of the populations of birds as discussed above, in step 312, the variable, NBR_ANIMALS, is assigned the value indicating the number of birds in the population to which the present invocation of the model is to be applied. Subsequently, in step 320, a determination is made of the percentages of saleable edible bird products that was obtained from this population of birds. In particular, a determination is made as to the average percentage of total saleable edible product (meat) provided per bird (in the variable, PCT_SALEABLE_MEAT), and a determination as to the average percentage of saleable breast meat per bird (in the variable, PCT_BREAST_YLD) . Following this step, in step 324, a determination is made as to the prices per pound of the bird meat obtained from the present population of birds. That is, a determination is made as to the average price received per pound for bird carcasses minus the breast meat (in the variable, PARTIAL_CARCASS_PRICE_PER_LB), and a determination of the price received per pound of bird breast meat (in the variable, BREAST_PRICE_PER_LB). Note that it is important to have distinct measurements for the price of bird breast meat and the remainder of the bird carcass, in that the prices for these two portions of bird meat typically have substantially diverged due to the growth in popularity of bird breast meat (such as chicken and turkey) at fast food outlets. For example, the average price received for chicken or turkey breast meat may be in the range of $1.00 to $2.50 per pound more than the average price per pound of non-breast chicken or turkey meat.

Subsequently, in step 328, statistics are determined related to the number of birds not processed (i.e., not processed) as saleable bird meat. In particular, three such measurements are determined. That is, a percentage of the original bird population that died at either the hatchery 24 or the broiler grow-out 28 (in the variable, MORTALITY), the number of birds condemned at the processing plant 36 (in the variable, NBR_CONDEMNED), and the percentage of the bird population that was condemned at the processing plant 36 (in the variable, PCT_CONDEMNED). Following this step, in step 332, statistics are determined related to the number of birds processed at the processing plant 36. More particularly, the total number of birds processed at the processing plant 36 is determined (in the variable, NBR_BIRDS_PROCESSED), and the number of birds processed that produced saleable bird meat rather than being condemned (in the variable, SALEABLE_MEAT_BIRDS).

Subsequently, in step 336, further statistics are determined related to the weights of the birds as measured at the processing plant 36. In particular, five statistics are provided. That is, the average weight of a bird in the present population when measured at the processing plant 36 (in the variable, AVG_WT), the average weight of saleable bird meat per bird (in the variable, CARCASS_WT), the average breast weight per bird (in the variable, BREAST_WT), and the average weight of a bird carcass after the breast meat is removed (in the variable, PARTIAL_CARCASS_WT).

Subsequently, in step 340, statistics are determined related to the cost of bird feed. In particular, six statistics are calculated by the model of the present invention. These six statistics are as follows: the average cost of bird feed per ton (in the variable, FEED_COST_PER_TON), the feed cost per pound (in the variable, FEED_COST_PER_LB), the average number of pounds of bird feed required to produce each pound of bird meat processed by the processing plant 36 as either saleable bird meat or condemned meat (in the variable, FEED_CONVERSION), the average amount of bird feed required by each bird in the present population (in the variable, AMT_OF_FEED_PER_BIRD), the average feed cost per bird in the present population (in the variable, FEED_COST_PER_BIRD) and the average feed cost per thousand birds in the present bird population being modeled (in the variable, FEED_COST_PER_THOUSAND). Note that it is particularly important that the present model includes statistics relating to the cost of bird feed in that this cost is typically the dominant expense in the bird growing and processing system of FIG. 1. For example, in a chicken growing and processing system, chicken feed costs are approximately 50% of the total expenses encountered in the chicken growing and processing system. Therefore, any change to the chicken growing and processing system which utilizes the chicken feed more efficiently (i.e., increases the valuable of the variable FEED_CONVERSION) could be of substantial benefit to the chicken growing and processing industry. However, in the growing and processing of chickens, as well as other types of fowl, many such potential beneficial changes have not been widely incorporated into their growing and processing systems since there has been no model as in the present invention to adequately measure the impact of such changes across the entire bird growing and processing system rather than a single component.

Subsequently, in step 344 of FIG. 3C, statistics related to the average value of the birds entering the processing plant 36 are determined. That is, the following five statistics are determined: the average value of a bird carcass minus the breast meat (in the variable, PARTIAL_CARCASS_VALUE), the average value of a bird breast in dollars per pound (in the variable, BREAST_VALUE), the average value of an entire bird in dollars per pound (in the variable, BIRD_VALUE), the total value of the saleable bird meat from the present bird population (in the variable, TOTAL_BIRD_VALUE), and the average value per thousand birds processed at the processing plant 36 (in the variable, BIRD_VALUE_PER_1000).

In step 348, statistics are determined related to the value of the birds condemned at the processing plant 36. The following statistics are computed: (a) the value of the birds condemned at the processing plant 36 (in the variable, CONDEMNED_VALUE), and (b) the condemned value, in dollars per pound, per thousand birds started and then processed (i.e., processed) by the processing plant 36 (in the variable, CONDEMNED_VALUE_PER_1000).

Subsequently, in step 352, statistics related to the cost (or credit) provided by the application of the bird growing and processing factor determined in step 208 of FIG. 2. The following two statistics are provided by the present model: (a) the total cost (or credit) related to the factor being assayed that is not included in any of the statistics determined above (in the variable, FACTOR_VALUE), and (b) the cost (or credit) of this factor per thousand birds started and then provided to the processing plant 36 (in the variable, FACTOR_VALUE_PER_THOUSAND). Accordingly, the two statistics determined here may be either positive or negative, depending on whether the factor is a credit or a cost, respectively, when applied to the bird growing and processing system. Thus, if the factor determined in step 208 of FIG. 2 is to, for example, widen the range of permissible temperatures allowed in one or more of the bird growing and processing components 20–36, then this factor would most likely provide a credit and therefore the statistics here would be positive.

In step 356, statistics related to the profit of the entire bird growing and processing system of FIG. 1 are computed. In the present model, the following two statistics are computed. The gross profit provided per thousand birds processed at the processing plant 36 (in the variable, GROSS_PROFIT_PER_1000) and an adjusted gross profit per thousand birds processed at the bird processing plant 36 wherein the gross product is adjusted by the addition of the value of the variable, FACTOR_VALUE_PER_1000.

Lastly, in step 360, the following variables have their values stored for later retrieval and comparison with corresponding stored values from a different activation of FIGS. 3A–3D wherein the primary difference between the activations is the change in the factor affecting one or more of the components 20–36 of the bird growing and processing system as determined in step 208 of FIG. 2. In particular, the following values are stored for further analysis: in NBR_BIRDS, MORTALITY, AVG_WT, FEED_CONVERSION, PCT_SALEABLE_MEAT, PCT_BREAST_YLD, FEED_COST_PER_TON, PARTIAL_CARCASS_PRICE_PER_LB, BREAST_PRICE_PER_LB, PCT_CONDEMNED, NBR_BIRDS_PROCESSED, BIRD_VALUE, BIRD_VALUE_PER_1000, CONDEMNED_VALUE_PER_1000, GROSS_PROFIT_PER_1000, FEED_COST_PER_1000, FACTOR_VALUE_PER_1000, GROSS_PROFIT_PER_1000, FEED_COST_PER_1000, and FACTOR_ADJUSTED_PROFIT.

Figure 4:
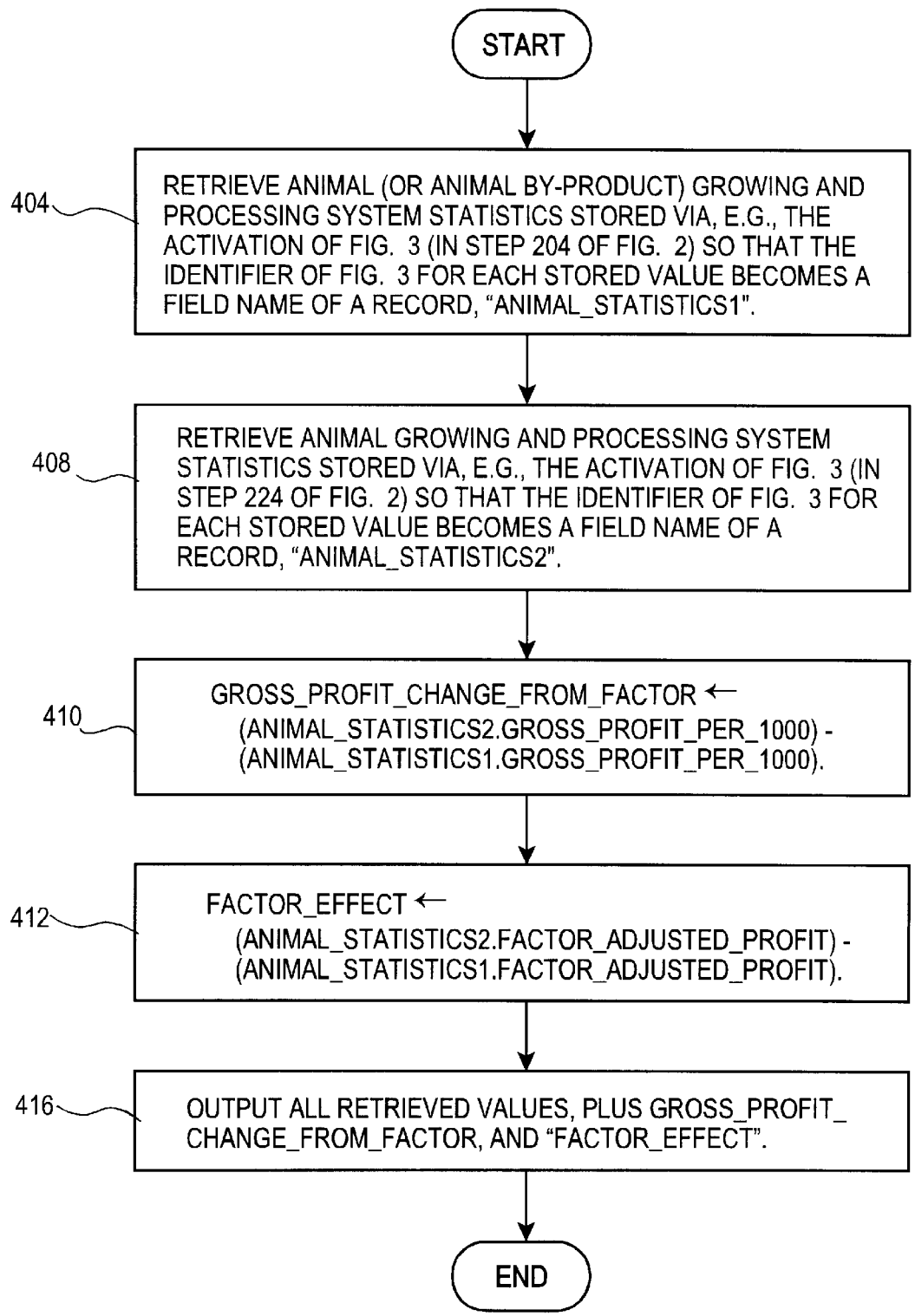
FIG. 4 is a flowchart for comparing the results of two different activations of the model of FIGS. 3A–3D and subsequently printing a report comparing the effect of a bird growing and processing system factor that changed between the two activations of FIGS. 3 and for determining the effect of this factor on the fowl growing and processing system of FIG. 1 as a whole.

In FIG. 4, a flowchart is presented of the steps performed in producing a report comparing two activations of the flowchart of FIGS. 3A–3D wherein these two activations model animal (or animal by-product) growing and processing systems that differ from one another substantially only by the application of the factor determined in step 208 of FIG. 2. Accordingly, in step 404 of FIG. 4, the growing and processing system statistics stored via step 360 from step 204 are retrieved into a record denoted, ANIMAL_STATISTICS1. Subsequently, in step 408, the growing and processing system statistics stored, via step 360 from step 224 of FIG. 2, are retrieved into a record denoted, ANIMAL_STATISTICS2. Following this step, in step 410, a computation is performed for determining the change in gross profit due to the assayed factor whose application to the growing and processing system changed between the growing and processing system measurements used to obtain the values in the record, ANIMAL_STATISTICS1, and those measurements used to obtain the statistics in the record, ANIMAL_STATISTICS2. Similarly, in step 412, a computation is made to determine the net profit effect of the assayed factor. In particular, a determination of the difference in gross profits is made, wherein these gross profits have been adjusted to take into account additional debits and/or credits related to the application (or non-application) of the factor whose effect is being assayed by the present invention. Subsequently, in step 416, the output of all retrieved values above and the newly computed values for GROSS_PROFIT_PER_1000 and FACTOR_EFFECT are output in a report. Examples of this report for assaying various bird growing and processing factors are provided in FIGS. 5–12. Moreover, in FIGS. 13 and 14, examples of similar reports are provided for turkey growing and processing systems. Note that the rightmost column (denoted the "identifier names" column) of each report provides the identifier names used in FIGS. 3 and 4 such that, for each identifier in this column, the values in the row for the identifier are associated with this identifier.

EXAMPLES

Examples of the output of the present invention are illustrated on FIGS. 5A through 12B. These examples illustrate the versatility of the chicken growing and processing assay method and system of the present invention. However, it should be noted that the statistics provided in these figures are, in some cases, approximations since internal computer representations introduce small variations in the values, as one skilled in the data processing art will appreciate. Further note that it is an aspect of the present invention that not all statistics of FIGS. 3 and 4 need be derived in order to provide an indication of the efficacy of the introduced factor. Accordingly, when a statistic is not provided or derived, then any subsequent use of the statistic will have a value zero as the value for the statistic.

FIGS. 5A and 5B illustrate a report output by the present invention that compares the statistics output in step 416 of FIG. 4 for two chicken populations (i.e., population A and population B). In particular, this report shows the effect of adding the feed additive, natamycin, to the chicken feed of population B.

The report of FIGS. 5A and 5B can be further described as follows. The column headed with the term "DESCRIPTION" provides an English description of the values in the rows of the report. The column headed "POPULATION A" includes the values output from the activation of FIGS. 3A–3D at step 204 of FIG. 2 wherein natamycin was not added to the chicken feed for the chicken population corresponding to this column. The values in the column headed "POPULATION B" were obtained from an activation of FIGS. 3A–3D via step 224 of FIG. 2, wherein these values relate to a chicken population having natamycin added to their chicken feed.

In a conventional analysis of the individual chicken growing and processing components 20–36 of FIG. 1, it is believed that adding natamycin to the chicken feed would be viewed as not cost effective since each of the chicken growing and processing components individually relies on one or more of the following rows in the report of FIGS. 5A and 5B: (a) the "feed conversion" row; (b) the additional cost for the natamycin (the row having the description "extra value (cost) for the assayed chicken growing and processing factor"); and (c) the "percent condemned" row. That is, these three rows of the report in FIGS. 5A and 5B indicate that there is: (a) negligible feed conversion increase due to natamycin; (b) there is a substantial extra cost associated with using natamycin in the chicken feed; and (c) a greater percentage of chickens are condemned at the processing plant 36. However, by modeling the chicken growing and processing system according to FIGS. 2–4, it is determined (in the last row of FIG. 5B) that there is a substantial benefit to using natamycin in the chicken feed; i.e., an increase of $8.87 per 1000 chickens processed. It is important to note that in previous conventional analyses of various individual components 20–36 of the chicken growing and processing system of FIG. 1, an increase in the profits of a component by even a few cents is important in that there may be as many as 200,000 processed per day in a chicken growing and processing system such as FIG. 1. Thus, the $8.87 indicated as the net change in gross profit due to the addition of natamycin in the chicken feed as indicated by the assay of the present invention provides a substantial incentive for introducing natamycin into the chicken feed for increasing the profits for the entire chicken growing and processing system.

FIGS. 6A and 6B provide a similar report to that of FIGS. 5A and 5B; however, FIGS. 6A and 6B are the output of an assay by the present invention for the effects of the substance, aflatoxin, a commonly occurring substance in a chicken growing and processing system which is toxic to chickens. In particular, referring to the report of FIGS. 6A and 6B, the column of statistics identified as "POPULATION A" was derived from a chicken population subject to no aflatoxin. Alternatively, the statistics of the column identified as "POPULATION B" were derived from a population of chickens that were subject to an average of 7.0 parts per billion of aflatoxin in their chicken feed. Accordingly, the last row of the report indicates that when the chicken growing and processing system is considered in its entirety, there is potentially a substantial amount of increase in profits for the chicken growing and processing system if aflatoxin is controlled.

Referring now to FIGS. 7A and 7B, statistics from the present invention are provided showing its use in measuring the cost effectiveness of two different kinds of chicken feeding mechanisms. In particular, the statistics for the column identified as "POPULATION A" are for a population of chickens processed by the chicken growing and processing system wherein a chain feeder was used to feed the chickens. Alternatively, the statistics for the column identified by "POPULATION B" are for a population of chickens that were fed using a pan feeder. Accordingly, as can be seen by examining the statistic in the final row of FIG. 7B, using pan feeders can significantly increase the cost effectiveness of the chicken growing and processing system.

Referring now to the reports of FIGS. 8, and FIGS. 9, these reports show the results of using the assay method and system of the present invention for evaluating presumably the same feed product provided by two different manufacturers. In particular, referring to FIGS. 8A and 8B, the statistics in the column headed "POPULATION A" were derived from a population of chickens that were fed a conventional or control chicken feed. Alternatively, the statistics of the column headed "POPULATION B" relates to a population of chickens that were fed a chicken medication formed into "plates" provided by a first manufacturer. Note that the change in gross profit statistic in the last row of FIG. 8B indicates the substantial cost effectiveness for the "plate" chicken medication of this manufacturer. Referring now to FIGS. 9A and 9B, a similar comparison is provided wherein, as in FIGS. 8A and 8B, the first column of statistics for "POPULATION A" is the control statistics duplicated from FIGS. 8A and 8B, whereas the second column of statistics for "POPULATION B" is for a chicken population fed a "plate" formed chicken medication from a different, second manufacturer. Note that there is also an increased cost effectiveness when the "plate" chicken medication of the second manufacturer is fed to the chickens. However, when the entire chicken growing and processing system as a whole is considered, there is a substantial difference in the cost-effectiveness between the "plate" chicken medication of these two manufacturers as shown by the assay method and system of the present invention. That is, when the chicken growing and processing system is viewed as a whole, even though the extra cost for the medication of the first manufacturer is approximately double the extra cost for the medication of the second manufacturer, this extra cost is more than offset by the seven-fold increase in the change in profits from using the "plate" chicken medication of the first manufacturer.

The reports of FIGS. 10 and FIGS. 11 provide a comparison similar to those of FIGS. 8 and FIGS. 9. However, instead of comparing different compositions of chicken medications that were provided in a similar form, (i.e., as "plates") as in FIGS. 8 and 9, in FIGS. 10 and FIGS. 11, substantially the same chicken medication was formed into two different chicken medication products, one being in the form of "needles" and the other being in the form of "plates." In particular, in FIGS. 10A and 10B the column of statistics headed "POPULATION B" provides the statistics for a population of chickens that were raised on chicken medication manufactured as "needles", whereas the column of statistics headed "POPULATION A" was derived from a control chicken population that was not fed the chicken medication. Similarly, in FIGS. 11A and 11B, the statistics of "POPULATION A" (also a control population) are compared with the "POPULATION B" statistics for a population of chickens raised on a chicken medication formed as "plates." Thus, note that in comparing the change in the gross profit statistic in the last row for FIGS. 10 and 11, the chicken medication manufactured as "plates" was demonstrated to be substantially more cost effective than the chicken medication manufactured as "needles." In fact, the chicken medication manufactured as "needles" was not as cost effective as the control chicken population that received none of the medication.

Further note that the present assay system and method could have also been used, for example, to directly compare the cost effectiveness of the "needle" and "plate" chicken medications of FIGS. 10 and FIGS. 11.

In FIGS. 12A and 12B, an assay report from the present invention is illustrated wherein the "POPULATION A" column includes statistics derived from a control chicken population and the "POPULATION B" column includes statistics derived from a population of chickens fed a factor consisting of a special granular mineral compound that was mixed with their feed. Accordingly, although there was additional cost for feed (i.e., FEED_COST_PER_TON), as well as an extra cost for the mineral compound (i.e., FACTOR_VALUE_PER_1000), the change in gross profit due to this mineral compound is substantial; i.e., $77.33. It is noteworthy that this assay indicates that most of change in gross profit was due to an increase in breast meat yield.

Also note that it is within the scope of the present invention to compare statistics relating to the efficacy of different amounts of the same factor as determined in step 208 of FIG. 2. Additionally, as one skilled in the art will appreciate, FIG. 2 may be modified so that comparisons as in step 228 of FIG. 2 may be used to compare the efficacy of changing a plurality of chicken growing and processing factors simultaneously. For example, there may be certain synergistic effects from simultaneously changing factors that appear to be substantially unrelated. For example, it may be that changing the number of hours of daylight provided to a chicken population and changing to pan feeders simultaneously provides a greater cost effectiveness than one might anticipate from examining the output of the present assay method and system for each such factor individually.

Referring now to FIGS. 13A and 13B, these figures illustrate a similar embodiment of the present for assaying turkey growing and processing systems as in FIG. 1. In FIGS. 13, the factor being assayed is a turkey growth promoter that can be incorporated into the turkey feed. Accordingly, POPULATION A is the control population and therefore did not receive the turkey growth promoter, while POPULATION B is the experimental population and therefore did receive the growth promoter. As the statistics of these figures show, the incorporation of the growth promoter makes the feed more expensive, i.e., $200 per ton for POPULATION A and $203 per ton for POPULATION B. However, the assay system of the present invention indicates that there is a net profit of $900.14 per 1,000 turkeys grown on the growth promoter (i.e., the value of FACTOR_EFFECT).

Referring now to FIGS. 14A and 14B, these figures represent a report generated by the present invention for a turkey growing and processing system as in FIG. 1, wherein a turkey treatment to reduce the mortality of turkeys is incorporated into the turkey feed. Thus, the control group (POPULATION A) did not receive this treatment, and the experimental group (POPULATION B) did receive this treatment. Accordingly, the feed cost per ton is greater in the treated or experimental POPULATION B than in POPULATION A (i.e., $200 per ton for POPULATION A, compared to $220 per ton for POPULATION B. Accordingly, by using the present invention to model the financial aspects for both populations of turkeys, it was determined that the use of this treatment produced a net profit of $389.79 per 1,000 birds started in the growing and processing system.

Moreover, those skilled in the art of data processing will readily understand that the present invention may be embodied in a software/hardware system that performs the flowcharts of FIGS. 2–4.

The foregoing description of the invention has been presented for purposes of illustration and description. Further, the description is not intended to limit the invention to the form disclosed herein. Consequently, variations and modifications commensurate with the above teachings, and combined with the skill or knowledge in the relevant art are within the scope of the present invention. The preferred embodiment described herein above is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. A method for assaying a fowl growing and processing system, comprising:

determining a first measurement of a characteristic of saleable bird meat produced by a fowl growing and processing system, wherein said fowl growing and processing system includes at least two of the following components: (a) a breeder farm, (b) a hatchery, (c) a raising facility, (d) a processing plant and (e) a bird transportation capability;

establishing a measurement of a factor related to processing birds;

providing said factor at said measurement to at least one of (a) through (e) of said fowl growing and processing system;

determining a second measurement of said characteristic of saleable bird meat produced by said fowl growing and processing system after said step of providing is performed for a predetermined time period; and comparing said first measurement of said characteristic of saleable bird meat with said second measurement of said characteristic of saleable bird meat for determining an effectiveness of said factor.

2. A method for assaying a fowl growing and processing system as claimed in claim 1, wherein said characteristic of saleable bird meat includes one of: a bird carcass characteristic, a bird breast characteristic, an amount related to a number of live birds, an amount related to a bird mortality rate, and an amount related to a price received for saleable bird meat.

3. A method for assaying a fowl growing and processing system as claimed in claim 2, wherein said bird carcass characteristic and said bird breast characteristic are measured by weighing.

4. A method for assaying a fowl growing and processing system as claimed in claim 1, wherein said factor includes one of: a quality of a substance consumable by birds, a quantity of a substance consumable by birds, and a bird growing and processing environmental characteristic.

5. A method for assaying a fowl growing and processing system as claimed in claim 4, wherein said environmental characteristic includes one of: a temperature, an amount of light, an audible stimulus, a visual stimulus and a cage size.

6. A method for assaying a fowl growing and processing system as claimed in claim 1, wherein said factor includes a drug consumable by birds.

7. A method for assaying a fowl growing and processing system as claimed in claim 1, wherein said factor includes one of a quality and quantity of feed for birds.

8. A method for assaying a fowl growing and processing system as claimed in claim 1, wherein said step of providing includes determining said components of said fowl growing and processing system which use said factor.

9. A method for assaying a fowl growing and processing system as claimed in claim 1, wherein said birds are turkeys and said predetermined time period is at 90 days to 210 days.

10. A method for assaying a fowl growing and processing system as claimed in claim 1, wherein said birds processed are one of: chickens, turkeys, ducks, geese and quail.

11. A method for processing bird meat, comprising:

determining a first measurement of a characteristic of saleable bird meat produced by a fowl growing and processing system, wherein said fowl growing and processing system includes at least two of the following components: (a) a breeder farm, (b) a hatchery, (c) a raising facility, (d) a processing plant and (e) a bird transportation capability;

determining a factor related to processing birds using said fowl growing and processing system;

establishing a criterion for measuring said factor, said criterion including at least one of: a quality of said factor, a quantity of said factor, and a price of said factor;

supplying said factor at a first value one or more selected components of the components (a)–(e) included in said fowl growing and processing system;

determining a second measurement of said characteristic of saleable bird meat produced by said fowl growing and processing system after said step of supplying is performed for a predetermined time; and comparing said first measurement of said characteristic of saleable bird meat to said second measurement of said characteristic of saleable bird meat for determining an effectiveness of said factor.

12. A method for processing bird meat as claimed in claim 11, wherein said characteristic of saleable bird meat includes a uniformity of breast size.

13. A method for processing bird meat as claimed in claim 11, wherein said step of supplying includes providing said factor to each of said selected components of said fowl growing and processing system effectively concurrently.

14. A method for processing bird meat as claimed in claim 11, wherein said step of supplying includes providing said factor to said each of said one or more selected components of said fowl growing and processing system in a predetermined order of said components.

15. A method for processing bird meat as claimed in claim 14, wherein said predetermined order of said selected components includes providing said factor to a particular one of said selected components when a predetermined generation of birds is transferred to said particular one of said selected components.

16. A method for processing bird meat, comprising:

determining a first measurement of a characteristic of saleable bird meat produced by a fowl growing and processing system, wherein said fowl growing and processing system includes at least two consecutive components of the following sequence of components: (a) a breeder farm, (b) a hatchery, (c) a raising facility, (d) a processing plant and (e) a bird transportation capability;

determining a factor related to processing birds that is used by each of said at least two consecutive components;

establishing a criterion for measuring said factor, said criterion including at least one of: a quality of said factor, a quantity of said factor and a price of said factor;

supplying said factor to each of said at least two consecutive components in a measurement determined using said criterion;

determining a second measurement of said characteristic of saleable bird meat produced by said fowl growing and processing system after said step of supplying is performed for a predetermined time; and comparing said first measurement of said characteristic of saleable bird meat to said second measurement of said characteristic of saleable bird meat.

17. An apparatus for assaying a fowl growing and processing system having at least two of the following components: (a) a breeder farm, (b) a bird hatchery, (c) a bird raising facility, (d) a bird processing plant and (e) a bird transportation capability, comprising:

means for inputting a first measurement for each parameter of a predetermined set of one or more bird growing and processing parameters, each said parameter related to a performance of said fowl growing and processing system and said performance measured according to a predetermined criterion related to saleable bird meat, wherein said first measurements are from a first population of birds processed by said fowl growing and processing system;

means for inputting a second measurement for each parameter of said predetermined set, wherein said second measurements are from a second population of birds processed by said fowl growing and processing system;

means for inputting a measurement of a controllable bird growing and processing factor related to said performance of said fowl growing and processing system in processing said second population of birds, wherein said controllable bird growing and processing factor is controlled differently in said first and second bird populations;

means for determining a first value for said predetermined criterion for said first bird population using said first measurements;

means for determining a second value of said predetermined criterion for said second bird population using said second measurements;

means for determining a third value measuring an impact on said performance criterion using said measurement of said controllable bird growing and processing factor;

means for adjusting said second value by said third value for comparing said first value with said adjusted second value to determine an effectiveness of said controllable bird growing and processing factor.

18. A apparatus for assaying a fowl growing and processing system as claimed in claim 17, wherein the saleable bird meat is one of: turkey meat, duck meat, goose meat and quail meat.

19. An apparatus as claimed in claim 17, wherein said predetermined set includes a parameter for some of the following: a number of birds in a bird population, an amount of total saleable bird meat per bird processed by said fowl growing and processing system, an amount of saleable breast meat per bird processed by said fowl growing and processing system, a partial carcass price per pound, a breast price per pound, a mortality of birds occurring prior to being transported to a bird processing plant, a number of birds condemned at said processing plant, a number of birds processed at said processing plant, a number of birds providing saleable bird meat, a measurement of the weight of birds at said processing plant, a carcass weight for birds at said processing plant, a breast weight for birds at said processing plant, a partial carcass weight for said birds at said processing plant, a bird feed cost, a bird feed conversion value, an amount of bird feed provided per bird, a feed cost per bird, a feed cost per population of birds, a partial carcass value, a breast meat value, a bird value, a value for a population of birds, a condemned bird value, a condemned value for a population of birds and a gross profit.

20. An apparatus as claimed in claim 17, wherein said controllable bird growing and processing factor includes one or more of the following: a substance consumable by birds, a quantity of a substance consumable by birds, a bird growing and processing environmental characteristic and a genetic breed of birds.

21. An apparatus as claimed in claim 17, wherein said predetermined criterion related to saleable bird meat includes determining a profit for said fowl growing and processing system.

22. An apparatus as claimed in claim 17, wherein said means for determining said third value includes determining one of a credit and a debit resulting from controllable bird growing and processing factor applied to said second population.

* * * * *